United States Patent [19]

Wellner et al.

[11] Patent Number: 4,465,826
[45] Date of Patent: Aug. 14, 1984

[54] CATALYST SYSTEMS CONTAINING AN ORGANIC DISULFIDE CARBOXYLATES AND/OR ORGANIC COMPLEX COMPOUNDS OF METALS, AND BASIC AMINES FOR THE OXIDATIVE HARDENING OF PLASTICS PRECURSORS CONTAINING MERCAPTO GROUPS

[75] Inventors: Wolfgang Wellner; Josef Pedain, both of Cologne; Hermann Gruber, Leverkusen, all of Fed. Rep. of Germany

[73] Assignee: Bayer Aktiengesellschaft, Leverkusen, Fed. Rep. of Germany

[21] Appl. No.: 379,808

[22] Filed: May 19, 1982

[30] Foreign Application Priority Data

May 26, 1981 [DE] Fed. Rep. of Germany ....... 3120993

[51] Int. Cl.$^3$ ........................ B01J 27/04; B01J 27/24
[52] U.S. Cl. ................................. 528/374; 502/168; 502/170; 502/167
[58] Field of Search ................. 252/431 C; 528/374; 502/167, 168, 170

[56] References Cited

U.S. PATENT DOCUMENTS

| | | | |
|---|---|---|---|
| 3,057,832 | 10/1962 | Brock | 525/332.7 |
| 3,219,638 | 11/1965 | Warner | 528/375 |
| 3,487,052 | 12/1969 | Millen | 528/374 |
| 3,880,787 | 4/1975 | Szail | 525/332.7 |
| 3,991,039 | 11/1976 | Gunter et al. | 260/79 |
| 4,067,842 | 1/1978 | Braden | 260/31.6 |
| 4,110,295 | 8/1978 | Wilhelm et al. | 260/30.4 |
| 4,113,707 | 9/1978 | Louthan et al. | 528/279 |
| 4,125,455 | 11/1978 | Herbstman | 252/431 C |
| 4,175,064 | 11/1979 | Landau et al. | 252/431 C |
| 4,224,200 | 9/1980 | Lamb | 260/18 R |
| 4,263,078 | 4/1981 | Millen et al. | 156/244.1 |
| 4,298,508 | 11/1981 | Lamb | 260/18 R |
| 4,314,920 | 2/1982 | Millen | 260/24 |
| 4,367,316 | 1/1983 | Tanaka et al. | 525/177 |

OTHER PUBLICATIONS

Gummi-Werkstoffe (Rubber Materials), by Dr. Khari Nagdi, First Edition, 1981—pp. 294-295.
Gmelin Handbuch der Anorganischem Chemie, (Table of Contents), Springer-Verlag, Berlin, Heidelberg, New York, 1980, 1979.

*Primary Examiner*—Delbert E. Gantz
*Assistant Examiner*—Lance Johnson
*Attorney, Agent, or Firm*—Gene Harsh; Joseph C. Gil; Thomas W. Roy

[57] ABSTRACT

This invention relates to the use of catalyst systems containing (a) dibenzothiazyl disulphide, (b) carboxylates and/or organic complex compounds of manganese, iron, nickel or cobalt and (c) organic bases selected from the group consisting of guanidines and tertiary amines optionally containing inert substituents, as reaction accelerators for the oxidative hardening of plastics precursors containing mercapto groups.

9 Claims, No Drawings

CATALYST SYSTEMS CONTAINING AN ORGANIC DISULFIDE CARBOXYLATES AND/OR ORGANIC COMPLEX COMPOUNDS OF METALS, AND BASIC AMINES FOR THE OXIDATIVE HARDENING OF PLASTICS PRECURSORS CONTAINING MERCAPTO GROUPS

BACKGROUND OF THE INVENTION

1. Field of the Invention

The present invention relates to a catalyst system for plastics precursors which may be hardened using oxygen and contain organically bound mercapto groups.

2. Description of the Prior Art

Oligomers and polymers which contain at least two mercapto groups may be hardened, as is known, using oxidizing agents, such as $MnO_2$, $PbO_2$, chromates or organic peroxides, to form commercially valuable, rubber-like plastics materials (for example, German Offenlegungsschrift Nos. 2,739,117 and 2,557,088 or German Auslegeschrift No. 2,363,856). The hardening operation is generally carried out in two-component processes, in which the oxidizing agents are mixed with polymercaptans shortly before the processing step. The direct use of atmospheric oxygen as an oxidizing agent according to one-component processes is usually impossible since the reactivity is too low. For this reason, catalysts are becoming increasingly important for the accelerated oxidative hardening of oligomers containing mercapto groups. In this respect, combinations of thiuramdisulphides with iron or manganese complexes are suggested as catalysts, for example, in U.S. Pat. No. 3,991,039. Systems of dithiocarbamates with specific metallic carboxylic acid salts or complexes are recommended as catalysts in U.S. Pat. No. 4,224,200. However, the prior art catalyst systems which have been mentioned are still worth improving, in particular with respect to the through-hardening rate which may be achieved therewith.

According to the present invention, novel catalyst systems have been found for the area of use mentioned which are superior to the prior art catalyst systems with respect to their reaction-accelerating effect. A more rapid through-hardening of coating compositions containing plastics precursors with mercapto groups as the binder is obtained in particular by the use according to the present invention of novel catalyst systems described in more detail in the following.

SUMMARY OF THE INVENTION

The present invention is directed to the use of catalyst systems containing
(a) dibenzothiazyl disulphide of the following formula:

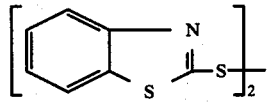

(b) carboxylates and/or organic complex compounds of manganese, iron, nickel or cobalt and additionally
(c) organic bases comprising a member selected from the group consisting of guanidine and quanidines substituted with inert substituents and tertiary amines containing inert substituents, as reaction accelerators for the oxidative hardening of plastics precursors containing mercapto groups.

DETAILED DESCRIPTION OF THE INVENTION

Component (a) of the catalyst systems to be used according to the present invention contains dibenzothiazyl disulphide of the above-mentioned formula.

Component (b) of the catalyst systems to be used according to the present invention comprises at least one carboxylate and/or at least one organic complex compound of manganese, iron, nickel or cobalt. The corresponding compounds of divalent manganese are particularly preferred. The nature of the carboxylate anion or of the complex former is of minor significance. The corresponding carboxylates of mono- or dibasic aliphatic, cycloaliphatic or aromatic carboxylic acids having from about 6 to 18 carbon atoms are suitable, e.g. the corresponding hexanoates, octoates, laurates, palmitates, stearates, benzoates, phthalates or naphthenates. Enolates such as, for example, the corresponding acetylacetonates are particularly suitable organic complex formers.

Component (c) of the catalyst systems to be used according to the present invention contains organic bases selected from the group consisting of guanidine and in particular guanidines or tertiary amines containing inert substituents. Guanidines which contain inert substituents and are suitable are, for example, such derivatives of guanidine in which both primary amino groups are substituted in each case by a $C_1$-$C_6$ alkyl radical or in each case by a phenyl radical, for example, N,N'-dimethylguanidine, N,N'-dihexylguanidine or N,N'-diphenylguanidine. Tertiary amines which are suitable are in particular those with a molecular weight range of from 79 to 300, for example, pyridine, N,N-dimethylaniline, triethylenediamine or hexamethylene tetramine (1,3,5,7-tetraazatricyclo[3.3.1.1$^{3,7}$]-decane). Of course, several basic compounds of this type may also be simultaneously present in the catalyst systems to be used according to the present invention.

From about 0.02 to 0.5 parts by weight, preferably from about 0.05 to 0.3 parts by weight, of component (b) and from about 0.05 to 1.0 parts by weight, preferably from about 0.1 to 0.5 parts by weight, of component (c) are generally present per part by weight of component (a) in the catalyst systems to be used according to the invention. The catalyst systems to be used are suitable as reaction accelerators for the oxidative hardening of any plastics precursors which contain at least two mercapto groups, as they are described, for example, in the references discussed in the Description of the Prior Art or in German Offenlegungsschrift No. 1,770,259; however, liquid plastics precursors are preferred. The catalyst systems to be used according to the present invention are added to the plastics precursors which are to be hardened oxidatively, i.e., in particular under the effect of atmospheric oxygen, in quantities of from about 0.01 to 5% by weight, preferably from about 0.5 to 1.5% by weight, based on the total weight of the catalyst systems according to the invention on the one hand and based on the weight of the plastics precursor on the other hand. The plastics precursors may be thoroughly mixed with the catalyst to be used according to the invention in such a manner that the previously prepared mixture of the individual components of the catalyst system is added to the plastics precursor or such that the individual components of the catalyst system are incorporated separately in the plastics precursor. A further alternative is to mix the catalyst system in the form of two components with the plastics precursor, the first component being a mixture of components (a) and (c) and the second component being component (b).

The plastics precursors containing the catalyst systems according to the present invention may, of course, contain conventional aids and additives, for example, plasticizers.

The use according to the present invention is particularly suitable for the production of coating compositions for any substrates, the compositions preferably being free from solvents and hardenable under the effect of atmospheric oxygen.

The following Examples further explain the use of the catalyst systems according to the present invention.

EXAMPLE 1

Preparation of an oligo-urethane (plastics precursor) containing mercapto groups according to German Offenlegungsschrift No. 1,770,359.

6,000 g of a polyether, having an average molecular weight of 6,000 which is started on trimethylolpropane and the polyalkylene-polyether chains of which consist to 78 mol % of propylene oxide units and to 22 mol % of ethylene oxide units, are mixed with 522 g of toluylene diisocyanate (2,4- and 2,6-isomers in a ratio of 80:20) and are converted under nitrogen at approximately 100° C. into an NCO prepolymer containing 1.8% of NCO. 222.6 g of mercaptoethanol are then added and the mixture is stirred at approximately 100° C. until NCO groups may no longer be detected in the IR spectrum. A clear, viscous liquid is obtained which is diluted to 80% in phthalic acid diisodecyl phthalate for further processing.

EXAMPLE 2

The efficiency of the catalysts according to the present invention is shown in different combinations. For this purpose, coatings which are approximately 1 mm thick are produced using the compositions stated in the following by mixing and pouring onto glass plates with hardening in the air at 23° C.

| Composition | A | B | C |
|---|---|---|---|
| Product from Example 1 | 50 g | 50 g | 50 g |
| Dibenzothiazyl disulphide and diphenylguanidine and hexamethylene tetramine = 70:15:15 | 1 g | 1 g | 1 g |
| Iron naphthenate in mineral spirit (7.5% Fe) | 1 g | — | — |
| Iron acetylacetonate 10% in xylene/methylene chloride 1:1 | — | 3 g | — |
| Manganese octoate in mineral spirit (6% Mn) | — | — | 1 g |
| Skin formation time in the air at 23° C. in minutes | 200 | 120 | 15 |

EXAMPLE 3

This Example which is otherwise analogous to Example 2 is used to compare the catalyst composition according to the present invention with those according to U.S. Pat. No. 3,991,039 (thiuram disulphides) and U.S. Pat. No. 4,224,200 (dithiocarbamates).

| Composition | I | II | III |
|---|---|---|---|
| Product from Example 1 | 50 g | 50 g | 50 g |
| Manganese octoate in mineral spirit (6% Mn content) | 1 g | 1 g | 1 g |
| Tetramethylthiuram disulphide | 1 g | — | — |
| Dibutyldithiocarbamate-zinc salt | — | 1 g | — |
| Dibenzothiazyl disulphide + diphenylguanidine + hexamethylene tetramine 70:15:15 | — | — | 1 g |
| Skin formation time in the air at 23° C. in minutes | 25 | 20 | 15 |

EXAMPLE 4

Comparison of the through-hardening acceleration of the catalysts according to the present invention compared to those according to U.S. Pat. No. 3,991,039 or U.S. Pat. No. 4,224,200 on the example of sealing compositions. For this purpose, the compositions stated in the following are drawn off into cartridges and are applied onto glass plates in the form of approximately 1 cm thick "sausages". After 5 days, it was established to what extent the "sausages" had inwardly hardened through from the surface.

| Composition | a | b | c |
|---|---|---|---|
| Product from Example 1 | 100 | 100 | 100 |
| Diisodecyl phthalate | 100 | 100 | 100 |
| Chalk powder having an 80 m²/g surface | 300 | 300 | 300 |
| Titanium dioxide | 20 | 20 | 20 |
| Manganese octoate in mineral spirit (6% Mn content) | 1 | 1 | 1 |
| Tetramethylthiuram disulphide | 1 | — | — |
| Dibutyldithiocarbamate-zinc salt | — | 1 | — |
| Dibenzothiazyl disulphide + diphenylguanidine + hexamethylene tetramine = 70:15:15 | — | — | 1 |
| Skin formation time in the air at 23° C. in minutes | 120 | 100 | 90 |
| Through-hardening after 5 days in mm | 1 | 0.5 | 3 |

EXAMPLE 5

In this Example, the efficiency of the catalyst composition according to the present invention is also demonstrated for other plastics precursors containing mercapto groups. For this purpose, two coatings are produced according to Example 2:

A = polyalkylene polysulphide having an average molecular weight of 4,000 and a viscosity of from 35 to 45 Pa.s at 27° C. (Thiokol ®LP-32 (Thiokol Chem. Corp.))

B = poly(oxalkylene)-polyester-poly(monosulphide)-polythiol prepared according to U.S. Pat. No. 4,224,200, Column 3, lines 41 to 51 (PM ®polymer of Phillips Petroleum Company) containing 0.85% mercapto groups and having a viscosity of 7 Pa.s at 25° C.

| Composition | I | II |
|---|---|---|
| Component A | 50 g | — |
| Component B | — | 50 g |
| Manganese octoate in mineral spirit (6% Mn) | 1 g | 1 g |
| Dibenzothiazyl disulphide + diphenylguanidine + hexamethylene tetramine 70:15:15 | 0.5 g | 0.5 g |
| Skin formation time in the air | 12 hours | 20 minutes |

| Composition | I | II |
|---|---|---|
| at 23° C. | | |

In the absence of catalysts the coatings do not show any skin formation upon storage in the air at 23° C. for 3 months.

What is claimed is:

1. A process for accelerating the oxidative hardening of plastics precursors containing mercapto groups which comprises adding a catalyst system containing
(a) dibenzothiazyl disulphide of the following formula:

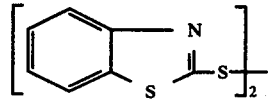

(b) about 0.02 to 0.5 parts by weight, based on the weight of component (a), of a carboxylate and/or an organic complex compound of manganese, iron, nickel, or cobalt and additionally
(c) about 0.05 to 1.0 part by weight, based on the weight of component (a), of an organic base comprising a member selected from the group consisting of guanidine, guanidines substituted with inert substituents and tertiary amines containing inert substituents,
to the plastics precursors containing mercapto groups and oxidatively hardening said plastics precursors.

2. The process of claim 1, wherein the individual catalyst components are incorporated individually into the plastics precursor to be hardened oxidatively or they are incorporated in the form of two individual components wherein the first component is a mixture of components (a) and (c) and the second component is component (b).

3. The process of claim 1 wherein component (b) is manganese octoate.

4. The process of claim 1 wherein component (c) is a mixture of diphenylguanidine and hexamethylene tetramine.

5. The process of claim 1 wherein component (b) is manganese octoate and component (c) is a mixture of diphenylguanidine and hexamethylene tetramine.

6. A catalyst composition comprising
(a) dibenzothiazyl disulphide of the following formula:

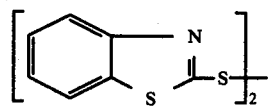

(b) about 0.02 to 0.5 parts by weight, based on the weight of component (a), of a carboxylate and/or an organic complex compound of manganese, iron, nickel or cobalt and additionally
(c) about 0.05 to 1.0 part by weight, based on the weight of component (a), of an organic base comprising a member selected from the group consisting of guanidine, guanidines substituted with inert substituents and tertiary amines containing inert substituents.

7. The composition of claim 6 wherein component (b) in manganese octoate.

8. The composition of claim 6 wherein component (c) is a mixture of diphenylguanidine and hexamethylene tetramine.

9. The composition of claim 6 wherein component (b) is manganese octoate and component (c) is a mixture of diphenylguanidine and hexamethylene tetramine.

* * * * *